US011228333B1

(12) United States Patent
Harris

(10) Patent No.: US 11,228,333 B1
(45) Date of Patent: Jan. 18, 2022

(54) PROTECTIVE CELL PHONE CASE WITH RETRACTABLE TETHER

(71) Applicant: Conell Harris, Newburgh, NY (US)

(72) Inventor: Conell Harris, Newburgh, NY (US)

( * ) Notice: Subject to any disclaimer, the term of this patent is extended or adjusted under 35 U.S.C. 154(b) by 0 days.

(21) Appl. No.: 14/464,187

(22) Filed: Aug. 20, 2014

Related U.S. Application Data

(60) Provisional application No. 61/867,817, filed on Aug. 20, 2013.

(51) Int. Cl.
*H04M 1/04* (2006.01)
*H04B 1/3888* (2015.01)

(52) U.S. Cl.
CPC ............ *H04B 1/3888* (2013.01); *H04M 1/04* (2013.01)

(58) Field of Classification Search
CPC ...... H04B 1/3888; H04M 1/18; H04M 1/185; H04M 1/0283; H04M 1/0214; A45C 2011/002; H04W 88/02; A45F 5/00; A45F 5/002; A45F 5/004; A45F 5/006; A45F 5/02; A45F 5/021; A45F 2200/0516
USPC ................................ 455/575.1, 575.6, 575.8
See application file for complete search history.

(56) References Cited

U.S. PATENT DOCUMENTS

| | | | |
|---|---|---|---|
| 6,070,273 A * | 6/2000 | Sgro | 2/455 |
| 8,509,865 B1 * | 8/2013 | LaColla et al. | 455/575.8 |
| 8,718,731 B1 * | 5/2014 | Tang | 455/575.8 |
| 2005/0011982 A1 * | 1/2005 | Salentine et al. | 242/379.2 |
| 2005/0088141 A1 * | 4/2005 | Lee et al. | 320/114 |
| 2010/0171021 A1 * | 7/2010 | Smith | 248/558 |
| 2013/0168423 A1 * | 7/2013 | Paugh et al. | 224/162 |
| 2013/0278215 A1 * | 10/2013 | Dea et al. | 320/111 |
| 2014/0175135 A1 * | 6/2014 | Paugh et al. | 224/219 |
| 2014/0253038 A1 * | 9/2014 | Posa | 320/111 |
| 2015/0027808 A1 * | 1/2015 | Baillargeon et al. | 182/3 |

* cited by examiner

*Primary Examiner* — Siu Lee
(74) *Attorney, Agent, or Firm* — Williams Intellectual Property; Benjamin F. Williams

(57) ABSTRACT

A protective cell phone case with retractable tether disposed to secure a cell phone to a user and prevent impact of the cell phone with a ground surface should a user inadvertently drop the cell phone during use, or otherwise while porting said cell phone, wherein a retractable tether member secures endwise to a user and forcibly retracts into a discoid housing exteriorly disposed upon a base whenever tension upon the tether member is released, whereby a cell phone is secured about a user and maintained proximal and suspendable thereto to prevent impact of a falling cell phone with the ground, as desired.

7 Claims, 3 Drawing Sheets

PROTECTIVE CELL PHONE CASE WITH RETRACTABLE TETHER

CROSS-REFERENCE TO RELATED APPLICATIONS

This nonprovisional application claims the benefit of provisional application No. 61/867,817 filed on Aug. 20, 2013.

FEDERALLY SPONSORED RESEARCH OR DEVELOPMENT

Not Applicable

INCORPORATION BY REFERENCE OF MATERIAL SUBMITTED ON A COMPACT DISK

Not Applicable

I claim the benefit of provisional application No. 61/867,817 filed on Aug. 20, 2013.

BACKGROUND OF THE INVENTION

Various types of protective cell phone cases are known in the prior art. However, what is needed is a protective cell phone case with retractable tether that secures a cell phone to a user and prevents impact of the cell phone with a ground surface should a user inadvertently drop the cell phone during use, or otherwise while porting said cell phone, wherein a retractable tether member secures endwise to a user and forcibly retracts into a discoid housing exteriorly disposed upon a base whenever tension upon the tether member is released, whereby a cell phone is secured about a user and maintained proximal and suspendable thereto to prevent impact of a falling cell phone with the ground, as desired.

FIELD OF THE INVENTION

The present invention relates to a protective cell phone case with retractable tether, and more particularly, to a protective cell phone case with retractable tether that secures a cell phone to a user and prevents impact of the cell phone with a ground surface should a user inadvertently drop the cell phone during use, or otherwise while porting said cell phone, wherein a retractable tether member secures endwise to a user and forcibly retracts into a discoid housing exteriorly disposed upon a base whenever tension upon the tether member is released, whereby a cell phone is secured about a user and maintained proximal and suspendable thereto to prevent impact of a falling cell phone with the ground, as desired.

SUMMARY OF THE INVENTION

The general purpose of the protective cell phone case with retractable tether, described subsequently in greater detail, is to provide a protective cell phone case with retractable tether which has many novel features that result in a protective cell phone case with retractable tether which is not anticipated, rendered obvious, suggested, or even implied by prior art, either alone or in combination thereof.

Many people know the inconvenience of dropping a cell phone, portable electronic device, handheld, or other peripheral (collectively disclosed as "cell phone" herein). Cell phones are typically sleek and may include glass surfaces by which touchscreen functionality is enabled. Impact of a cell phone can fracture surfaces, damage components, and render said cell phone unusable necessitating often costly repairs or replacement. The present invention has been devised to prevent impact of a cell phone with a ground surface when said cell phone is inadvertently dropped.

The present protective cell phone case with retractable tether has been devised to enable secure portage of a cell phone while preventing contact of said cell phone with a ground surface should the cell phone be inadvertently dropped during use, or otherwise when porting the cell phone. The present protective case with retractable tether includes a tether member attachable to a user. The tether member is retractably housed upon the case whereby said tether member prevents contact of the case, and any cell phone therein contained, with a ground surface, as will be explained subsequently.

The case includes a base disposed to contact a rear face of an extant cell phone when said cell phone is secured into the case. A plurality of side walls is perimetrically disposed upon the base, each of said plurality of side walls disposed to engage around a cell phone positioned therebetween. A plurality of reinforcing members is exteriorly disposed cornerwise upon the plurality of side walls and reinforcing panels may also be disposed exteriorly upon the base. In the preferred embodiment herein contemplated, the reinforcing members and panels may include carbon fiber, para-aramid fiber, or another polymeric or durable material whereby protection of a cell phone is effected. The case may likewise be manufactured from such materials.

The tether member is retractably disposed upon a spool mounted within a discoid housing exteriorly disposed upon the base. The spool is rotatable in each of a first direction and a second direction. When the tether is extended from the discoid housing, the spool is rotated in the first direction. When the tether is retracted into the discoid housing, the spool is rotated in the second direction.

A spring member is disposed in tensioned communication with the spool. Rotation of the spool in the first direction, therefore, tensions the spring member. The spring member thereby forces rotation of the spool in the second direction and effectively retracts the tether from an extended position to a retracted position.

Extension of the tether member form within the discoid hosing is thereby effected against the action of the spring member. A user, therefore, exerts a force upon the tether member to extend the tether member from the discoid housing, said force greater than the force applied by the tension of the spring. Release of the tether when in the extended position, then, enables rapid retraction of the tether into the discoid housing as the spring member is released and the spool is forced to rotate in the second direction.

A clip member is disposed endwise upon the tether member for releasably attachment to a user. The clip member releasably secures the tether member endwise to a user, whereby the case is suspendable from the user at the point of attachment. The clip member is configured to seat into a clip seating recess exteriorly disposed upon the case proximal the discoid housing. When the tether member is moved to the retracted position, the clip member is seatable within the clip seating recess.

A user may, therefore, attach the clip member to a belt, for example, or other item of clothing or accoutrement disposed about the user's person, whereby the case is secured thereto and the clip releasably secured within the clip seating recess. When use of the phone is desired, the user accesses the phone and pulls the case away from the clip member, whereby the tether member is extended from the discoid housing against the action of the spring member. After use of the phone is effected, a user may reposition the phone to engage the clip member into the clip seating recess, and thus secure the phone to said user's person, whereby the tether member is automatically retracted into the discoid housing.

To arrest abrupt forces rendered against the tether member, such as may occur, for example, by inertia of the phone against the tether member during locomotion, for example, of a user wearing the case, a pretensional brake mechanism is contemplated for use with the device. The pretensional brake mechanism is disposed engaging the tether member within the discoid housing, said pretensional brake mechanism disposed to prevent extension of the tether member from the discoid housing when abrupt forcing of the tether member is sensed thereat.

A user may thus fluidly extend the tether member for use of a cell phone ported within the case. Should the user inadvertently drop the phone, the slack of the tether member is rapidly retracted into the discoid housing by forcing action of the spring member against the spool, and further extension of the tether member by inertia of the cell phone's weight abruptly engaging against the tether member during a fall is prevented by the pretensional brake mechanism.

The present protective cell phone case with retractable tether therefore safely secures a cell phone to a user and prevents contact of the cell phone with a ground surface should a user inadvertently drop the cell phone from his person.

Thus has been broadly outlined the more important features of the present protective cell phone case with retractable tether so that the detailed description thereof that follows may be better understood and in order that the present contribution to the art may be better appreciated.

Objects of the present protective cell phone case with retractable tether, along with various novel features that characterize the invention are particularly pointed out in the claims forming a part of this disclosure. For better understanding of the protective cell phone case with retractable tether, its operating advantages and specific objects attained by its uses, refer to the accompanying drawings and description.

BRIEF DESCRIPTION OF THE DRAWINGS

Figures

DETAILED DESCRIPTION OF THE DRAWINGS

Figure 1:
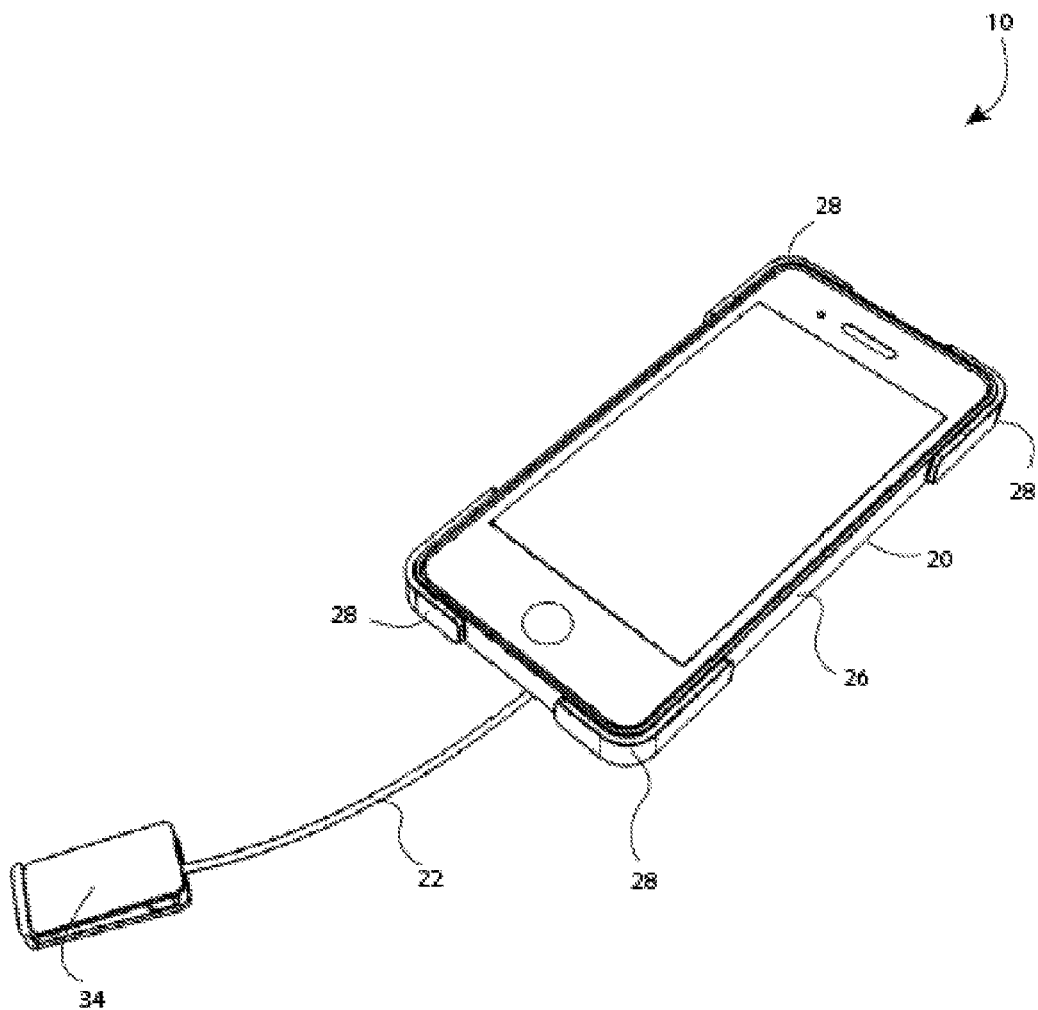
FIG. 1 is an front view with a tether member partially extended from a discoid housing.
Figure 2:
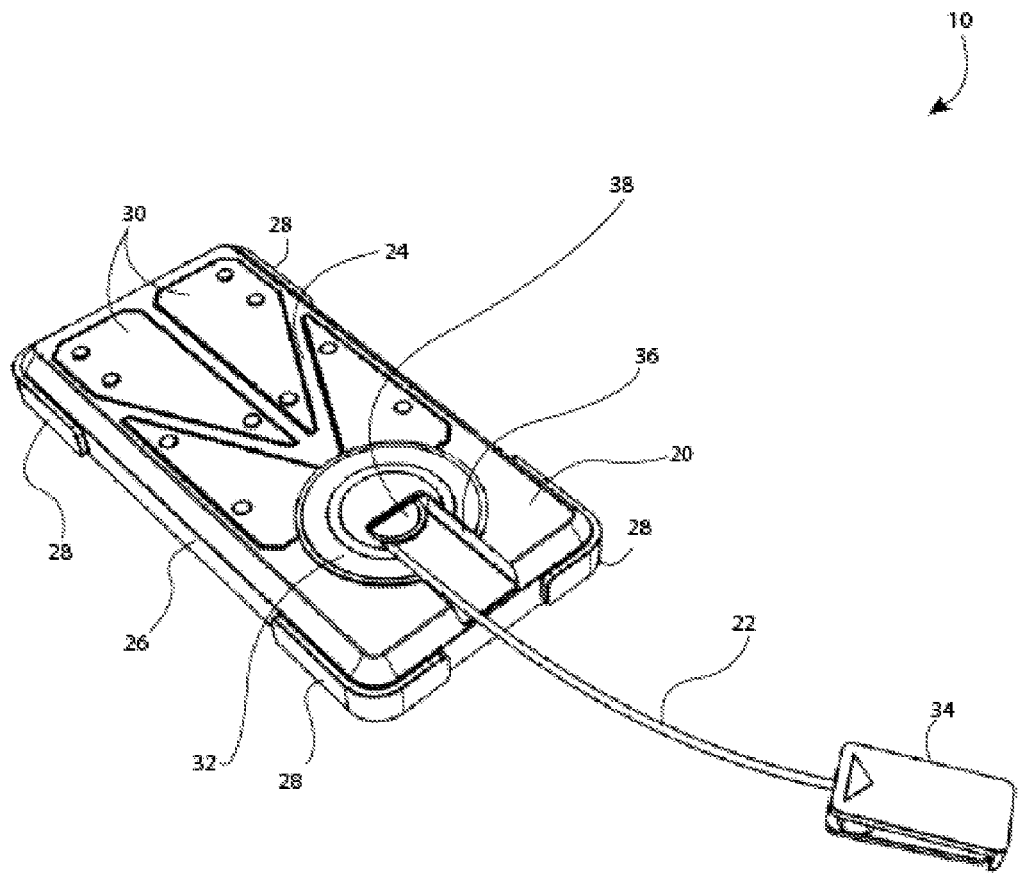
FIG. 2 is a rear view with the tether member partially extended from the discoid housing.
Figure 3:
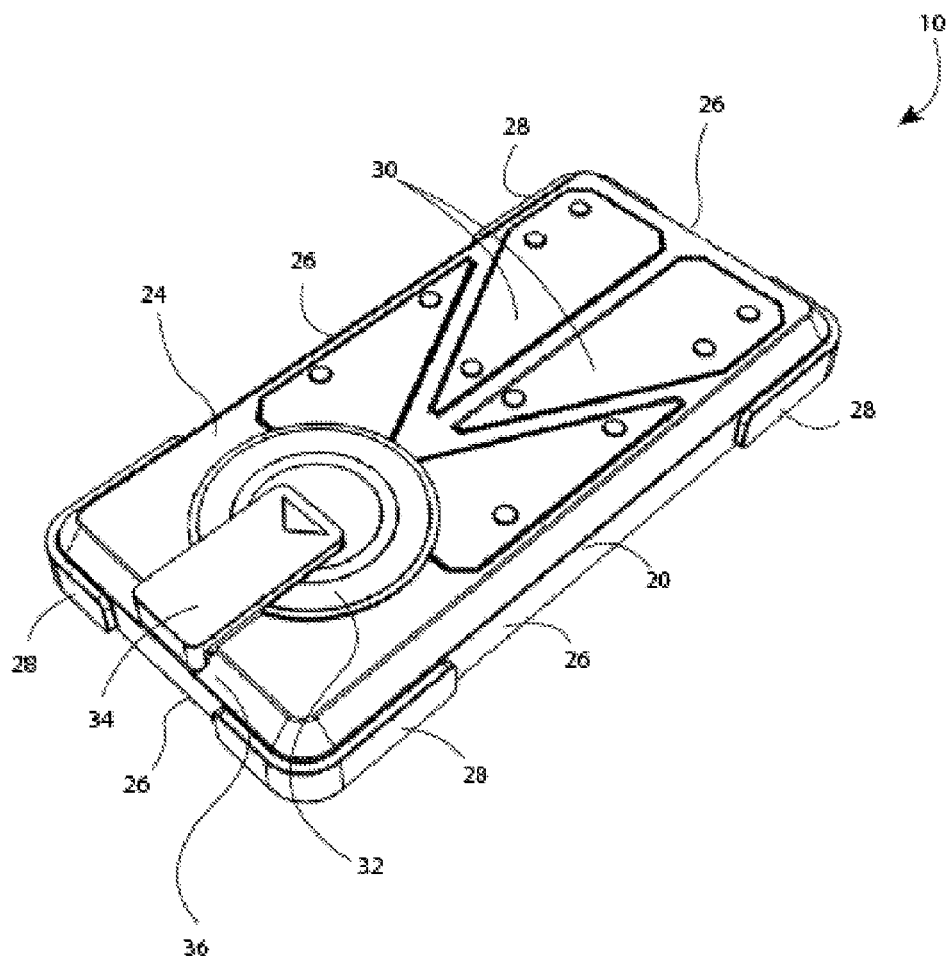
FIG. 3 is a rear view with a clip member seated within a clip seating recess.

With reference now to the drawings, and in particular FIGS. 1 through 3 thereof, example of the instant protective cell phone case with retractable tether employing the principles and concepts of the present protective cell phone case with retractable tether and generally designated by the reference number 10 will be described.

Referring to FIGS. 1 through 3 a preferred embodiment of the present protective cell phone case with retractable tether 10 is illustrated.

The present protective cell phone case with retractable tether 10 has been devised to securably house a cell phone 70 and prevent contact of said cell phone 70 with a ground surface should the cell phone 70 be inadvertently dropped by a user.

The present protective cell phone case with retractable tether 10, therefore, includes a protective case 20, into which an extant cell phone 70 is releasably securable. A tether member 22 is retractably disposed upon the case 20, said tether member 22 attachable to a user whereby the case 20 is suspendable from the user and thereby prevented from contacting the ground should a user inadvertently drop the cell phone 70 during use, or when otherwise porting said cell phone 70 within the case 20.

The case 20 includes a base 24 disposed to contact the rear face of an extant cell phone 70 when said cell phone 70 is secured into the case 20. A plurality of side walls 26 is disposed perimetrically upon the base 24, each of said plurality of side walls 26 enclosing an aperture into which an extant cell phone 70 is insertable for securement therein.

Each of a plurality of reinforcing members 28 is disposed exteriorly cornerwise upon each of the plurality of side walls 26. A plurality of reinforcing panels 30 is likewise exteriorly disposed upon the base 24. The plurality of reinforcing members 28 and panels 30 provide additional protection for the cell phone 70 positioned into the case 20.

A rotatable spool 38 is exteriorly disposed upon the base 24 within a discoid housing 32. The tether member 22 is extensible from within the discoid housing 32 when the spool 38 is rotated in a first direction. A spring member is disposed within the discoid housing 32 in tensional engagement with the spool 38, whereby the spring member is tensioned when the spool 38 is rotated in the first direction. Thus, extension of the tether member 22 from within the discoid housing 32 tensions the spring member.

The action of the spring member upon the spool 38 forces the spool 38 in a second direction. Once extended from the discoid housing 32, release of the tether member 22 thereby causes retraction of the tether member 22 into the discoid housing 32 as the spring member forces rotation of the spool 38 in the second direction. The tether member 22 is thus retractable into the discoid housing 32 and storable in a retracted position.

A clip member 34 is disposed endwise upon the tether member 22, said clip member 34 disposed for releasable attachment to a user. The clip member 34 thereby releasably secures the tether member 22 to a desired item of clothing, or other accoutrement or object disposed upon or proximal a user, and enables suspension of the case 20 therefrom.

A user is thereby enabled to retrieve the phone 70 and position the phone 70 appropriate for use while maintaining attachment of the case 20 to the user. The extensible tether member 22 enables positioning of the phone 70, as desired, within a range delimited by extension of the tether member 22, while the case 20 remains attached to the user by means of the clip member 34 disposed endwise upon the tether member 22. Thus, should a user inadvertently drop the phone 70 during use, or otherwise when porting the phone 70, the tether member 22 retracts and prevents contact of the phone 70 with the ground.

A pretensional brake mechanism is contemplated as part of the invention 10, said pretensional brake mechanism disposed to arrest the tether member 22 when abrupt action is deployed thereto. The tether member 22 is thus prevented from extending during locomotion of a user, for example, by inertial forces acting against the tether member 22 under the acceleration of gravity.

When a user drops the phone 70, the tether member 22 is immediately slackened whereby action of the spring member forces rapid rotation of the spool 38 in the second direction to recoil the tether member 22 and prevent contact of the cell phone 70 with the ground. Sudden force against the tether member 22, as when the weight of the cell phone 70 engages against the tether member 22, is arrested by the pretensional brake mechanism and further extension of the tether member 22 from the discoid housing 32 is prevented.

The case 20 also includes a clip seating recess 36 exteriorly disposed proximal the discoid housing 32, wherein the clip member 34 releasably engages for storage when not in use. The clip member 34 seats into the seating recess 36 when the tether member 22 is moved to the retracted position.

A user may thus attach the clip member 34 to a belt, for example, or other item of clothing or accoutrement of the user, and maintain the case 20 proximal the user with the clip member 34 seated in the seating recess 36. When the cell phone 70 is desired for use, a user may retrieve the cell phone 70, release the clip member 34, and pull against the tether member 22, thereby tensioning the spring member and extending the tether member 22 from the discoid housing 32. After use of the cell phone 70 is completed, the user may return the cell phone 70 to a position with the clip member 34 engaged within the seating recess 36. The tether member 22 is expediently retracted into the discoid housing 32 during replacement of the cell phone 70 to its position proximal the clip member 34.

The present invention 10, therefore, enables convenient portage of a cell phone 70 in a protective case 20 while preventing impact of the phone 70 with the ground, or other surface, when the cell phone 70 is inadvertently dropped by a user.

What is claimed is:

1. A protective cell phone case with retractable tether comprising:
    a case disposed for protective portage of an extant cell phone therein;
    a tether member disposed upon the case, said tether member extendible from the case against action of a spring member;
    a clip member disposed endwise upon the tether member, said clip member attachable to a user and securable seated into the case when the tether member is disposed in a retracted position; and
    a pretensional brake mechanism disposed arresting extension of the tether member when abrupt action is deployed thereto;
    wherein the case is securable to a user by attachment of the clip member and the case is distally deployable upon the tether member against action of the spring member, whereby said case is retractably housable upon a user and inadvertent contact of a cell phone with a ground surface is preventable.

2. The protective cell phone case with retractable tether of claim 1 wherein the tether member is disposed upon a rotatable spool, said rotatable spool rotatable in each of a first direction and a second direction.

3. The protective cell phone case with retractable tether of claim 2 wherein the rotatable spool is disposed exteriorly upon the case interior to a discoid housing.

4. The protective cell phone case with retractable tether of claim 3 wherein rotation of the rotatable spool in the first direction effects tensioning of the spring member and said spring member thereby elastically effects responsive rotation of the rotatable spool in the second direction, whereby the tether member is responsively retractable subsequent extension of the tether member.

5. The protective cell phone case with retractable tether of claim 4 wherein the clip member is releasably securable interior to a clip seating recess disposed upon the case when said tether member is disposed in the retracted position.

6. The protective cell phone case with retractable tether of claim 5 wherein the case further comprises:
    a base disposed to contact a rear surface of as the extant cell phone positioned interior to said case;
    a plurality of side walls disposed perimetrically upon the base enclosing an aperture into which said extant cell phone is insertable for securement therein;
    a plurality of reinforcing members disposed exteriorly cornerwise upon each of the plurality of side walls; and
    a plurality of reinforcing panels disposed exteriorly upon the base.

7. A protective cell phone case with retractable tether comprising:
    a case appropriate for protective portage of an extant cell phone therein, said case including:
        a base disposed to contact a rear face of a cellphone positioned within the case;
        a plurality of side walls disposed perimetrically upon the base enclosing an aperture into which said extant cell phone is insertable for securement therein;
        a plurality of reinforcing members disposed exteriorly cornerwise upon each of the plurality of side walls;
        a plurality of reinforcing panels disposed exteriorly upon the base;
    a discoid housing disposed exteriorly upon the base;
    a rotatable spool disposed within the discoid housing, said rotatable spool rotatable in each of a first direction and a second direction;
    a spring member disposed within the discoid housing, said spring member responsively tensioning against action of the rotatable spool when said spool is rotated in the first direction, said spring member thereby elastically effective of rotation of the rotatable spool in the second direction;
    a tether member disposed upon the rotatable spool and extensible therefrom from a retracted position, said tether member extensible when the rotatable spool is rotated in the first direction, said tether member retractable when the rotatable spool is rotated in the second direction;
    a clip member disposed endwise upon the tether member, said clip member attachable to a user;
    a clip seating recess disposed exteriorly upon the case proximal the discoid housing, said clip seating recess disposed to accommodate the clip member releasably engaged therein when the tether member is disposed in the retracted position; and
    a pretensional brake mechanism disposed in operational communication with the rotatable spool, said pretensional brake mechanism arresting rotation of the rotatable spool when abrupt action is deployed thereto;
    wherein the clip member is attachable to a user to maintain the case proximal the user when said clip member is seated within the clip seating recess, said clip member thence releasable from the seating recess for extension of the tether member, wherein the case is distally deployable and retractably housable upon a user whereby inadvertent contact of a cell phone with a ground surface is preventable.

\* \* \* \* \*